US 9,280,171 B2

(12) United States Patent
Hillier

(10) Patent No.: US 9,280,171 B2
(45) Date of Patent: Mar. 8, 2016

(54) ROCKER FULCRUM ASSEMBLY FOR USE WITH HAND TRUCKS OR DOLLIES

(76) Inventor: Gregg Hillier, Lomita, CA (US)

(*) Notice: Subject to any disclaimer, the term of this patent is extended or adjusted under 35 U.S.C. 154(b) by 194 days.

(21) Appl. No.: 12/804,625

(22) Filed: Jul. 26, 2010

(65) Prior Publication Data
US 2012/0018965 A1 Jan. 26, 2012

(51) Int. Cl.
B62B 1/00 (2006.01)
G05G 1/04 (2006.01)
B62B 1/14 (2006.01)

(52) U.S. Cl.
CPC .. *G05G 1/04* (2013.01); *B62B 1/14* (2013.01); B62B 2203/05 (2013.01); Y10T 74/20582 (2015.01)

(58) Field of Classification Search
CPC .............. G05G 1/04; B62B 1/14; B62B 1/00; B62B 2203/05; Y10T 74/20582

USPC ........................ 280/47.12, 47.2, 47.23, 47.27
See application file for complete search history.

(56) References Cited

U.S. PATENT DOCUMENTS

| 1,341,171 | A | * | 5/1920 | Hall | 280/47.12 |
| 1,376,955 | A | * | 5/1921 | Littlefield | 280/47.12 |
| 1,578,602 | A | * | 3/1926 | Heath | 280/47.12 |
| 2,102,684 | A | * | 12/1937 | Dorward | 280/47.12 |
| 2,710,195 | A | * | 6/1955 | Kurth | 280/5.24 |
| 4,239,249 | A | * | 12/1980 | Sprague | 280/47.2 |

* cited by examiner

Primary Examiner — Hau Phan
(74) Attorney, Agent, or Firm — Fitzsimmons IP Law

(57) ABSTRACT

A Rocker Fulcrum Assembly for use with hand-trucks or dollies includes an outside flange, and an inside flange and at least two rocker plates. The outside flange comprises a first side and a second side. The inside flange comprises a connecting side and a planar side. The rocker plates are disposed underneath the flanges. The wheels are disposed at a point above the ground as the planar member rests flat on the ground.

20 Claims, 3 Drawing Sheets

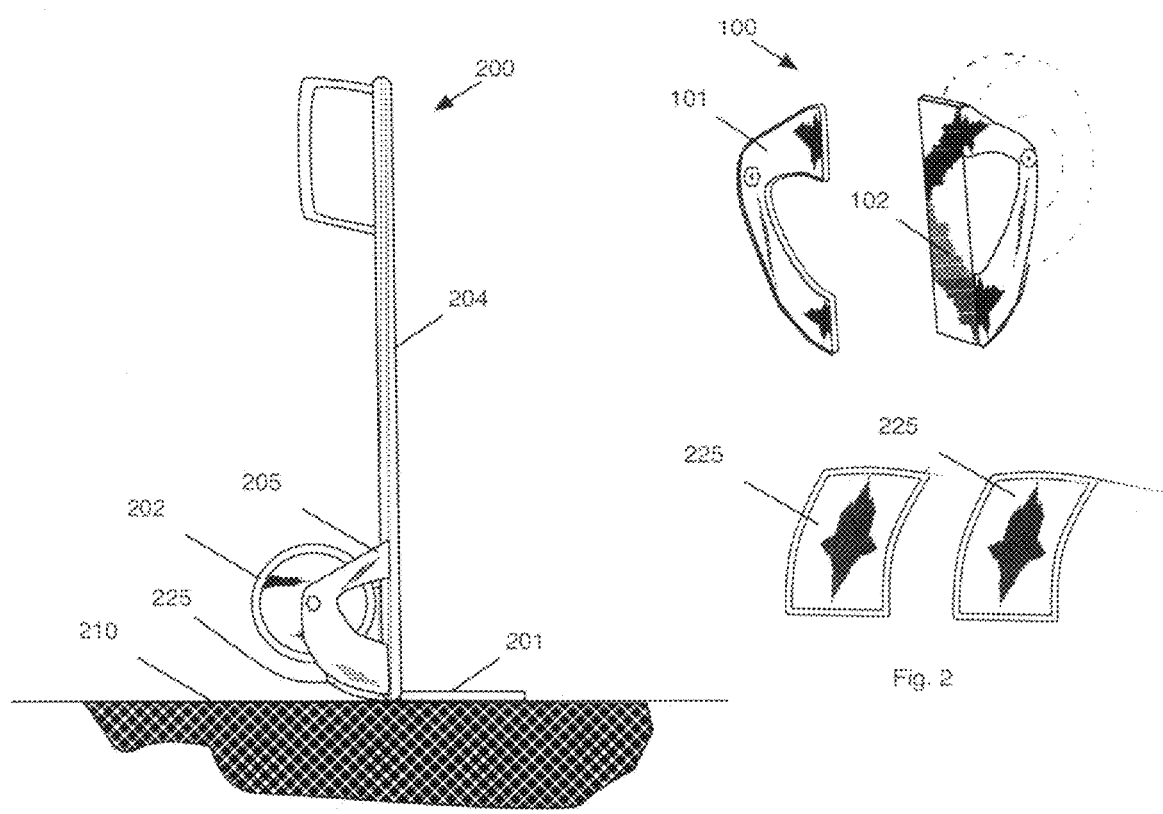
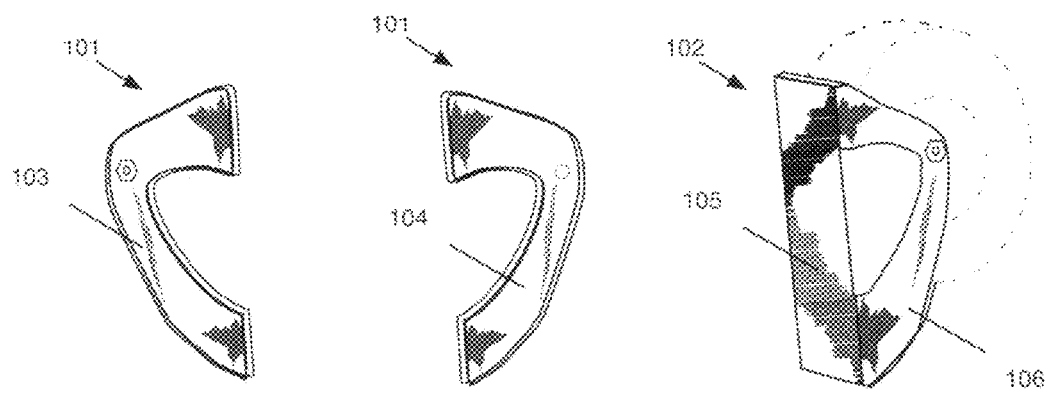

ROCKER FULCRUM ASSEMBLY FOR USE WITH HAND TRUCKS OR DOLLIES

FIELD OF THE INVENTION

The present invention is in the area of moving equipment, and particularly pertains to improvements to dollies or hand trucks.

BACKGROUND OF THE INVENTION

One of the most grueling jobs involves the lifting, transporting, and moving of heavy objects. These occupations or the individual tasks can be quite laborious and stressful. These tasks are so taxing on the human body, that each year thousands of people are injured or debilitated in these endeavors.

In order to alleviate some of the stress and burden, a hand truck is used to facilitate the movement of heavy objects. These hand trucks are standard-issued equipment in almost all industries, warehouses, etc.

After placing a load on the hand truck, the two most difficult aspects of lifting are the amount of pull force necessary to lift the object and the wheel-roll of the dolly or hand truck. The amount of pull-force necessary to lift an object with a hand-truck or dolly is the ratio of the length of the handles and the distance between the axle and the center of gravity of the object being lifted. For example, with a 4 foot handle and 1 foot between the axle and the center of gravity, the resulting ratio is 4:1. Therefore, for a load of 500 lbs, an operator must expend 125 lbs of pull force.

Furthermore, an equal amount of counterforce must be exerted against the axle to prevent the hand-truck from rolling backwards towards the operator. The same problem with wheel roll is also encountered while setting the load back on the ground. To counter the wheel-roll, one must place their foot on the axle. The heavier the load, the harder one must pull and the more force one must place with their foot on the axle. And with a heavy load, this could translate into a hundred pounds of force or more.

Therefore what is clearly needed is an apparatus which enables a handtruck or dolly to be used with minimal effort. This apparatus should increase the amount of leverage by moving the fulcrum point closer to the object being lifted. The apparatus should also eliminate the problem of wheel-roll one faces while lifting or setting the load.

SUMMARY OF THE INVENTION

It is an object of the present invention to provide an improved hand truck which is easier to use. The present invention alleviates some of the typical physical exertion a person must expend in using the typical hand truck to move large and heavy loads.

It is an object of the present invention to make the operation of hand trucks easier by increasing the leverage and eliminating the problem of wheel roll. This is accomplished through the utilization of the rocker fulcrum assembly.

BRIEF DESCRIPTION OF THE DRAWING FIGURES

FIG. 1 is a side elevation view of a preferred embodiment of the present invention.

FIG. 2 is a perspective view of a preferred embodiment of the present invention.

FIG. 3 is a perspective view of a preferred embodiment of the present invention.

FIG. 4 is a perspective view of a preferred embodiment of the present invention.

FIG. 5 is a perspective view of a preferred embodiment of the present invention.

DESCRIPTION OF PREFERRED EMBODIMENTS

Figure 6:
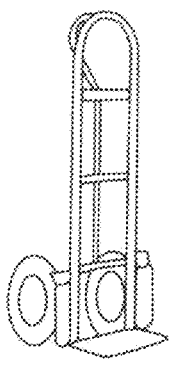
FIG. 6 is a perspective view of the prior art.

According to a preferred embodiment of the present invention, a unique Rocker Fulcrum Assembly is used to provide for an improved hand truck. This unique design enables an easier usage of hand trucks for moving various large and heavy objects. The unique design and the unique placement of the wheels of the dolly decreases the amount of effort a person must expend to load heavy objects onto a hand truck. The present invention is described in enabling detail below.

For the purposes of the present invention, the term "hand truck" should be understood to also refer to "dollies" or a "hand truck dolly".

FIGS. 1-2 illustrates a preferred embodiment of the present invention. A Rocker Fulcrum Assembly 100 includes a rocker plate 225, an outer flange 101, and an inner flange 102. The outer flange 101 comprises a first side 103 and a second side 104. The inner flange 102 comprises a connecting side 105 and a planar side 106. These two flanges are affixed with the vertical assembly of the hand truck. The inner flange 102 is connected with the vertical assembly at the connecting side 105. The wheels are affixed to the flanges. Moreover, the flanges also have an orifice for connecting with the wheels. Both flanges have a crescent shape with a radius at the bottom approximately the same as the radius of the wheel. Both flanges also have the same radius as the rockerplate 225.

FIG. 2 also illustrates the rocker plate 225. The rocker plate 225 is affixed to the planar member of the dolly. The rocker plate 225 is also affixed with the inner and outer flanges.

In some preferred embodiments, the inner flange is made from a single piece of metal plating. This metal plating is bent at a 90 degree angle to form the connecting side 105. The connecting side 105 can vary in width in order to accommodate various sizes of wheels.

FIGS. 1-2 illustrate a preferred embodiment of the present invention. An Improved Hand Truck 200 includes a planar member 201, two wheels 202, a vertical assembly 204, two outside flanges 205, and two inside flanges. The two outside flanges 205 are connected with the two wheels 202 and the vertical assembly 204. The two inside flanges 206 are also connected with the two wheels 202 and the vertical assembly 204. In some preferred embodiments, the inside flanges 206 and outside flanges 205 are 205 are welded to the vertical assembly 204 and planar member 201. In some preferred embodiments the rocker plate 225 is welded to the vertical assembly 204 and the bottom of the flanges.

FIG. 1 illustrates that in some preferred embodiments, the two wheels 202 are disposed at a point above the ground as the planar member 201 rests flat with the ground 210. This placement of the two wheels 202 above the ground gives the Improved Hand Truck 200 an advantage over the prior art in that it increases the leverage of an operator.

As the operator pulls the handles of the Improved Hand Truck 200, the Improved Hand Truck 200 rocks into position on the rocker plates 225 until the wheels come in contact with the ground. This movement eliminates the problem of wheel-roll because the wheels do not touch the ground until the load is sufficiently lifted. During the lift, the weight rests on the rocker plates 225 which, in turn, is supported by the flanges until the weight is transferred to the wheels of the Improved Hand Truck 200.

Figure 7:
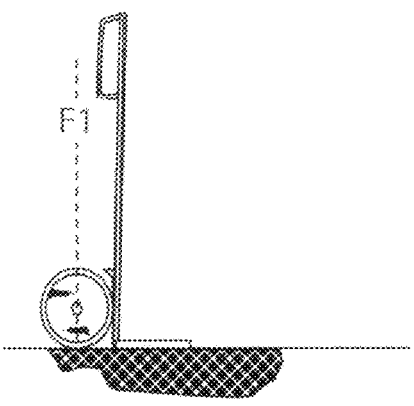
FIG. 7 is a side elevation view of the prior art.
Figure 8:
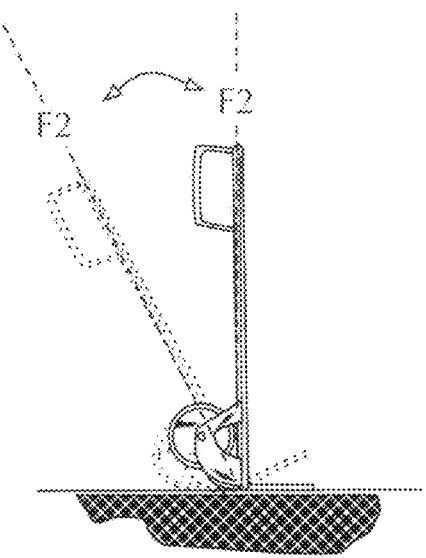
FIG. 8 is a side elevation view of a preferred embodiment of the present invention.
Figure 9:
FIG. 9 is a plan view of a preferred embodiment of the present invention.
Figure 10:
FIG. 10 is a plan view of a preferred embodiment of the present invention.
Figure 11:
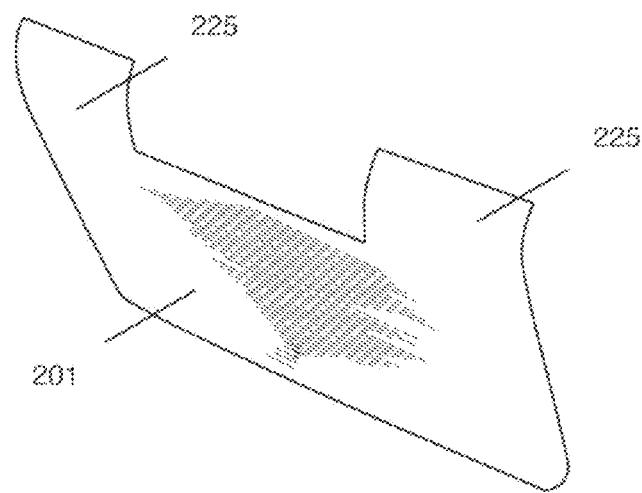
FIG. 11 is a perspective view of a preferred embodiment of the present invention.
Figure 12:
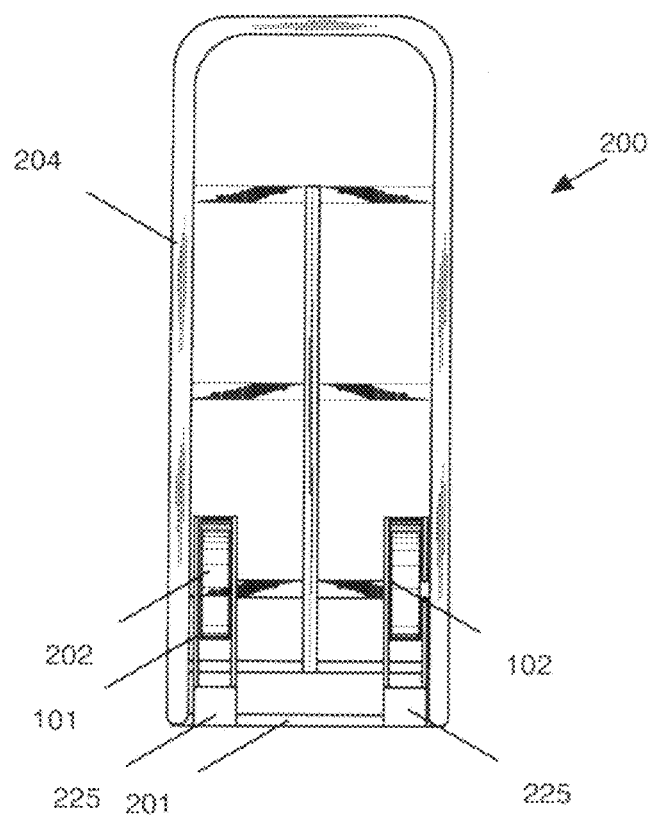
FIG. 12 is an elevation view of a preferred embodiment of the present invention.

FIG. 7 illustrates the fulcrum point F1 of the prior art which extends down an axis through the diameter of the wheel of the prior art dolly. In contrast, the fulcrum point illustrated in FIG. 8 of the present invention F2 is moved closer to the load. This is achieved in part due to the unique positioning of the wheels above ground as the planar member lies flat on the ground. This fulcrum point extends down an axis through the handle. By moving this fulcrum point closer to the load to be lifted, an operator is given greater leverage and easier handling of both the dolly and the load.

It will be apparent to the skilled artisan that there are numerous changes that may be made in embodiments described herein without departing from the spirit and scope of the invention. For example, the design of the flanges could be shaped in different forms but still achieve the same functions as set forth in the specification. As such, the invention taught herein by specific examples is limited only by the scope of the claims that follow.

What is claimed is:

1. A hand truck comprising:
   a deck plate having a lower surface and an upper surface configured to support at least a portion of a load, said lower surface being configured to rest on a ground when said hand truck is in a parked position;
   a vertical assembly oriented perpendicularly to said deck plate, said vertical assembly having at least a front planar surface, said front planar surface being configured to support at least a portion of said load when said hand truck is in a lifted position;
   a rocker assembly connected to said vertical assembly and comprising at least a rocker plate having an arcuate side, said arcuate side being configured to lift said load when said hand truck is moved from said parked position to said lifted position and having a lowest point substantially aligned with said lower surface of said deck plate; and
   at least two wheels connected to said rocker assembly, said at least two wheels being located entirely behind a rear side of said vertical assembly and a distance above said upper surface of said deck plate, allowing said at least two wheels to only come into contact with said ground when said hand truck is in said lifted position.

2. The hand truck of claim 1, wherein said rocker assembly further includes a plurality of flanges, said rocker plate being connected to said vertical assembly via said plurality of flanges.

3. The hand truck of claim 2, wherein said at least two wheels are connected to said vertical assembly and said rocker plate via said plurality of flanges.

4. The hand truck of claim 2, wherein said plurality of flanges comprises a first outer flange, a second outer flange, a first inner flange, and a second inner flange, a first one of said at least two wheels being held in place via said first inner flange and said first outer flange, and a second one of said at least two wheels being held in place via said second inner flange and said second outer flange.

5. The hand truck of claim 4, wherein said plurality of flanges further includes a planar surface, said planar surface being connected to said vertical assembly.

6. The hand truck of claim 1, wherein said rocker assembly further includes a plurality of flanges, said at least two wheels being connected to said vertical assembly via said plurality of flanges.

7. The hand truck of claim 1, wherein said arcuate side has a radius that is substantially the same as a radius of said at least two wheels.

8. The hand truck of claim 1, wherein said rocker assembly further includes two outer flanges, each one of said outer flanges having an arcuate side with a radius that is substantially the same as a radius of said arcuate side of said rocker plate.

9. The hand truck of claim 1, wherein said vertical assembly comprises a plurality of tubular structures, a front-most portion of each one of said plurality of tubular structures defining said front planar surface.

10. The hand truck of claim 1, wherein said fulcrum point is substantially along a rear side of said vertical assembly.

11. The hand truck of claim 1, wherein said arcuate side has a first end and a second, said first end being in contact with said ground when said hand truck is in said parked position, and said at least two wheels only coming into contact with said ground when said second end is in contact with said ground.

12. A method for manufacturing a hand truck, comprising:
   forming a primary assembly, comprising:
      a deck plate having a lower surface and an upper surface configured to support at least a portion of a load, said lower surface being configured to rest on a ground when said hand truck is in a parked position; and
      a vertical assembly oriented perpendicularly to said deck plate, said vertical assembly having at least a front planar surface, said front planar surface being configured to support said load when said hand truck is in a lifted position; and
   attaching a secondary assembly to said primary assembly, said secondary assembly comprising:
      a rocker assembly connected to said vertical assembly and comprising at least a rocker plate having an arcuate side, said arcuate side being configured to lift said load when said hand truck is moved from said parked position to said lifted position and having a lowest point substantially aligned with said lower surface of said deck plate; and
      at least two wheels connected to said rocker assembly, said at least two wheels being located entirely behind a rear side of said vertical assembly and a distance above said upper surface of said deck plate, allowing said at least two wheels to only come into contact with said ground when said hand truck is in said lifted position.

13. The method of claim 12, wherein said rocker assembly further includes a plurality of flanges, said rocker plate being connected to said vertical assembly via said plurality of flanges.

14. The method of claim 13, wherein said at least two wheels are connected to said vertical assembly and said rocker plate via said plurality of flanges.

15. The method of claim 13, wherein said plurality of flanges comprises a first outer flange, a second outer flange, a first inner flange, and a second inner flange, a first one of said at least two wheels being held in place via said first inner flange and said first outer flange, and a second one of said at least two wheels being held in place via said second inner flange and said second outer flange.

16. The method of claim 15, wherein said plurality of flanges further includes a planar surface, said planar surface being connected to said vertical plate assembly.

17. The method of claim 12, wherein said rocker assembly further includes a plurality of flanges, said at least two wheels being connected to said vertical assembly via said plurality of flanges.

18. The method of claim 12, wherein said arcuate side has a radius that is substantially the same as a radius of said at least two wheels.

19. The method of claim 12, wherein said rocker assembly further includes two outer flanges, each one of said outer flanges having an arcuate side with a radius that is substantially the same as a radius of said arcuate side of said rocker plate.

20. The method of claim 12, wherein said arcuate side has a first end and a second, said first end being in contact with said ground when said hand truck is in said parked position, and said at least two wheels only coming into contact with said ground when said second end is in contact with said ground.

* * * * *